UNITED STATES PATENT OFFICE.

FRANK LANGFORD, OF EUREKA, CALIFORNIA.

TREATMENT OF CLAYS AND EARTHS.

1,308,429.     Specification of Letters Patent.     Patented July 1, 1919.

No Drawing.     Application filed November 23, 1917. Serial No. 203,566.

*To all whom it may concern:*

Be it known that I, FRANK LANGFORD, a citizen of the United States, residing at Eureka, in the county of Humbolt and State of California, have invented new and useful Improvements in Treatment of Clays and Earths, of which the following is a specification.

This invention relates to the production of aluminum and aluminum compounds and provides a process by means of which ores not commonly used for the production of aluminum may be prepared economically for use in producing pure aluminum.

One feature of the invention includes the use of the wood of the California redwood tree, *Sequoia sempervirens*, as the source of the tannic acid used in extracting the iron and other common impurities from aluminous clays and in rendering aluminous earths and clays more easily soluble in sulfuric acid solutions, as described in my Patent No. 1251057. In that application the treatment was as follows: I first treated the crushed clay, earth or ore with a solution of tannin or tannic acid in water, by agitation and leaching in any suitable apparatus, to remove the common impurities, such as iron and other metals and alkalis, compounds of calcium, magnesium and other substances present in the form of oxids and hydroxids, and which are soluble or floatable in tannin or tannic acid solutions. I next separated the solutions from the residue, by any suitable method, such as settling, decanting and the like. Part of the iron or other impurities is removed in this step in combination with the tannic acid wash solution. The remaining residue may be treated as often as desired with fresh lots of tannic acid solution until sufficiently freed of impurities. The final residue is then suitable for use as clay, sand or ore, and the aluminum compounds are more readily soluble in subsequent treatment.

In addition to this new use of the redwood tree, there is in this invention, it is now believed, the production of sulfuric acid through the interaction of tannins, and perhaps other substances of the wood, with the sulfur gases introduced in the presence of air and the contact surfaces of particles of the ore and the wood. Also it is believed that the aluminum of the ore or clay particles is attacked and dissolved by the sulfuric acid at the instant of formation or while in the nascent state. There is also involved the extraction of tannins and hydrocarbons from the wood, and cellulose fiber or altered wood pulp is produced. It is apparent also that soluble iron, alkalis and carbonates, and other fractional impurities of clays would in many cases go into solution with the tannic acid before the dissolving of the aluminum compounds, and that if the process were stopped at this latter point a refined clay would be produced which would be suitable for refractories. If the process were stopped at an earlier stage there would be provided sulfo-tannates or some similar derivatives and probably very little of anything else in the extract. The use of aluminum sulfate for the production of the sulfurous gases for the process is also an important point.

The invention includes the production of wood pulp from the redwood tree of California, *Sequoia sempervirens*, and woods having similar sap, binder and tannin contents, and pertains particularly to the use of the waste extracts obtained from such wood and consists of agitating and leaching the wood, bark or foliage of the redwood tree in water, a water solution of sulfurous acid or dilute sulfuric acid or sulfurous gases, or similar mineral acid to extract from the redwood pulp the staining, corroding acid sap, hydrocarbon compounds and tannins with which the cellulose fiber of the wood is combined, saturated or bound together in nature. The remaining cellulose fiber is suitable for pulping for wood pulp, or for wood products, the material having been first comminuted and then treated, or first treated and then comminuted, or employed as and left in the form of block wood, depending upon the products that are desired and the use contemplated for the extracts and the fiber or wood. The extraction process may be conducted with acids of different degrees of dilution, at different temperatures, and under different pressures above or below atmospheric pressure, and for different periods of time according to the conditions encountered.

The wood will give up to said acid solutions its acid sap, its tannins, and its hydrocarbons and various binding elements separately and successively by varying the time of treatment, the strength of the acid, the quantity of the solution with respect to the quantity of the pulp, the pressure, or the temperature. Substances of various composition may be extracted. The fiber remaining will contain more or less of such substances as may be desired and will be improved in color and in structure, and in durability, and will possess fire resisting properties and other qualities desirable in the further use of the wood. The invention provides substances containing tannin compounds or tannin derivatives useful and applicable to the tanning of leather, and to other uses such as the formation of tannates of iron, lime, sulfuric acid, and the like.

In the treatment of aluminous clays and earths it may be desirable to extract the acid sap and the tannins and some of the hydrocarbon binding substances of the wood together and to employ this extract solution to saturate and wash clay, laterite, bauxite, or other aluminous compounds to first purify them by uniting or causing a reaction between the acid substance of the solution and the oxids, hydroxids, carbonates, sulfates or other compounds of iron, titanium, manganese, calcium, magnesium, sodium, potassium, sulfur, and the like that are common impurities of such aluminous ores and earths. The impurities are thus separated chemically and removed mechanically from the aluminous compounds of the ores, earths, and clays. This is accomplished by heating the mixture and agitating, settling, decanting, or filtering off the liquid from the solids and if desirable by washing the residue containing the aluminous compounds in hot water, depending upon the conditions and upon the products desired. For example, for the subsequent production of aluminum sulfate, alumina, or aluminum, I prefer to wash the aluminous residue thoroughly; while for the production of refractory materials, in some classes of material, I prefer to leave the aluminous residue saturated with the hydrocarbon and acid compounds contained in the extract solution, these acting in a beneficial way as a chemical and fuel agent in the subsequent heat treatment of burning of the refractory material.

In the treatment of aluminous ores, clays, laterites, and like earths with the redwood extract, it has been found that by using concentrated solutions and high temperatures near to or at the boiling point of the mass for a longer time than is required for extracting most of the impurities, the aluminous compounds will begin to be broken down and extracted or changed from a solid, like a silicate or hydroxid, to salts of aluminum having the characteristics of sulfates and sulfites, and this action which is undesirable for some uses of aluminous materials, such as for refractories, may be controlled or prevented by varying the duration of the treatment and stopping the extraction process when aluminum begins to enter the solutions more than the impurities. When it is desired to extract the aluminum from such ores and materials, I prefer first to eliminate the impurities in the manner hereinbefore described and without roasting or calcining the crude material or the purified residue containing the aluminous silicate or other aluminous compound. Next, this residue is mixed with finely comminuted redwood fiber or the extract therefrom, and into the slurry or liquid mixture, under pressure greater than one atmosphere, there is injected the sulfurous gases from burning pyrites or aluminum sulfate or alunite, or sulfur and the like. Then air is circulated through the mixture and it is heated possibly to dryness or even to ignition to drive off all moisture including water of crystallization and to bring about and accelerate the reactions between the sulfur gases and the redwood extract and the clay or aluminous material and formation of sulfates or sulfites. The aluminous compounds are changed, liberated, and enter into solution and the silica and insoluble portion drop out as residue upon dilutions with water, settling, decanting or filtering.

I find that by the treatment of injecting sulfurous gases into the wet redwood mixture, the saps, tannins, and hydrocarbon compounds of the wood react with the sulfurous gases in the presence of aluminous earth and the wood fiber to promote the formation of sulfuric acid, and that the aluminum and other soluble minerals of the clay or ore go into solution finally as sulfates, sulfites or similar combinations with sulfur, although complicated and obscure reactions take place leading up to this result.

The acid extracts from the redwood when filtered through clayey aluminum ores give up substances to the clay that burn at low temperatures and are entirely consumed apparently.

A wet mixture of the redwood pulp with clay or aluminous ore and sulfurous gases and air, heated, produces an extract that, separated from the sand and wood fiber residue and evaporated and heated, ignites at a low temperature and leaves a residue of alumina, the tannin and wood extracts apparently acting as a fuel at this stage, supporting combustion and aiding in driving off completely the sulfur and some volatile impurities.

I find that aluminum silicates and hydrates like halloysite, alum clay, and rhyolite mud or ash that has been erupted at volcanic heat and deposited in water, whereby the extremely fine material has been segregated from the coarser in large deposits formed on the California coast sea margins.

give up their aluminum content and leave the silica as a residue by mixing with redwood pulp and water and injecting sulfur gases and applying heat and pressure, and that the necessary reactions and the solution of the aluminum compounds are accelerated by heating in or blowing in air, either hot or cold air.

The use of the term wood of the *Sequoia sempervirens* includes the use of the foliage, bark, or any other portion of the tree of that species.

What I claim is:—

1. The process of treating aluminous earths and like materials to remove undesirable impurities which process consists in washing the material to be treated with a solution containing tannic acid obtained from the wood of the *Sequoia sempervirens*, and removing the tannic acid solution from the aluminous residue.

2. The process of treating clays and earthy materials containing aluminum and iron to remove the iron which process consists in washing the material to be treated with a solution containing tannic acid obtained from the wood of the *Sequoia sempervirens*, and separating the tannic acid solution with the iron content taken up hereby from the aluminous residue.

3. The process of treating aluminous earths and like materials to remove undesirable impurities which process consists in washing the material to be treated with a solution containing tannic acid obtained from the wood of the *Sequoia sempervirens*, removing the solution of tannic acid from the insoluble residue, treating the insoluble residue with sulfuric acid to form a solution of sulfates and an insoluble residue, and separating said solution of sulfates from said insoluble residue.

4. The process of treating aluminous earths and like materials to obtain relatively pure aluminum sulfate which consists in washing the materials to be treated with a solution containing tannic acid obtained from the wood of the *Sequoia sempervirens*, removing the solution of tannic acid with all material dissolved therein or held in suspension thereby from the insoluble residue, treating the insoluble residue with sulfuric acid to form sulfate solutions and a second insoluble residue, and separating the sulfate solutions from the second insoluble residue.

5. The process of treating clays and like materials containing aluminum silicates and impurities to remove the impurities and render the aluminum silicates readily soluble in mineral acid solutions, which process consists in washing the material to be treated with a solution containing tannic acid obtained from the wood of the *Sequoia sempervirens* to take up the impurities, and separating the tannic acid and impurities from the residue not taken up by the tannic acid.

6. The process of treating aluminous earths and like materials containing aluminum silicates to obtain relatively pure silica, which process consists in washing the material to be treated with a solution containing tannic acid obtained from the wood of the *Sequoia sempervirens*, removing the solution of tannic acid with all materials dissolved therein or held in suspension thereby from the insoluble residue, treating the insoluble residue with a mineral acid to form a solution and a second insoluble residue containing a high percentage of silica, and separating the solution from the second insoluble residue.

7. The process of treating aluminous earths and like materials to remove undesirable impurities, which process consists in providing a wet mixture of comminuted wood of the *Sequoia sempervirens* together with the earthy material to be treated, adding to said mixture sulfur oxygen compounds to produce a solvent solution to take up the undesirable impurities without dissolving the aluminum content of the mixture, and separating the insoluble aluminous content from said solvent solution.

8. The process of treating aluminous earths and like materials to remove undesirable impurities, which process consists in providing a wet mixture of comminuted wood of the *Sequoia sempervirens* together with the earthy material to be treated, adding to said mixture sulfur oxygen compounds to produce a solvent solution to take up the undesirable impurities without dissolving the aluminum content of the mixture, separating the insoluble aluminum content from the solution, treating the insoluble aluminum residue with sulfuric acid to form a solution of sulfate and an insoluble residue, and separating said solution of sulfates from said insoluble residue.

9. The process of treating aluminous earths and like materials to remove undesirable impurities, which process consists in providing a wet mixture of comminuted wood of the *Sequoia sempervirens* together with the earthy material to be treated, adding to said mixture sulfur oxygen compounds to produce a solvent solution to take up the undesirable impurities without dissolving the aluminum content of the mixture, separating the insoluble aluminum content from the solution, treating the insoluble aluminum residue with sulfuric acid to form a solution of sulfate and an insoluble residue, separating said solution of sulfates from said insoluble residue, and roasting said sulfates to provide sulfur compounds for the treatment of said mixture of wood and earthy material.

10. The process of treating aluminous earths and like materials to remove undesirable impurities, which process consists in providing a wet mixture of comminuted wood of the *Sequoia sempervirens* together with the earthy material to be treated, adding sulfur gases to said mixture of comminuted wood and earthy material to produce a solvent solution to take up the undesirable impurities without dissolving the aluminum content of the mixture, and separating the insoluble aluminum content from said solvent solution.

11. The process of treating aluminous earths and like materials to remove undesirable impurities, which process consists in providing a wet mixture of comminuted wood of the *Sequoia sempervirens* together with the earthy material to be treated, passing sulfur gases through said wet mixture of comminuted wood and earthy material to produce sulfuric acid to take up the undesirable impurities without dissolving the aluminum content of the mixture, and separating the insoluble aluminum content from said solvent solution.

12. The process of treating aluminous earths and like materials to remove undesirable impurities, which process consists in providing a wet mixture of comminuted wood of the *Sequoia sempervirens* together with the earthy material to be treated, passing sulfur gases through said mixture of comminuted wood and earthy material to produce sulfuric acid in its nascent state, which sulfuric acid while in the nascent state takes up the undesirable impurities without dissolving the aluminum content of the mixture, and separating the insoluble aluminum content from said solvent solution.

13. The process of treating aluminous earths and like materials to remove undesirable impurities, which process consists in providing a wet mixture of comminuted wood of the *Sequoia sempervirens* together with the earthy material to be treated, passing sulfur gases through said mixture of comminuted wood and earthy material to produce a solvent solution containing sulfuric acid in its nascent state to take up the undesirable impurities without dissolving the aluminum content of the mixture, adding a moistening medium, and heating the same with the introduction of air and under pressure greater than atmospheric pressure, and separating the insoluble aluminum content from said solvent solution.

14. The process of treating aluminous earths and like materials to remove undesirable impurities, which process consists in providing a wet mixture of comminuted wood of the *Sequoia sempervirens* together with the earthy material to be treated, passing sulfur gases through said mixture of comminuted wood and earthy material to produce a solvent solution to take up the undesirable impurities without dissolving the aluminum content of the mixture, introducing a moistening medium, introducing air, and heating the same under pressure greater than atmospheric pressure, and separating the insoluble aluminum content from said solvent solution.

15. The process of treating aluminous earths and like materials to remove undesirable impurities, which process consists in providing a wet mixture of comminuted wood of the *Sequoia sempervirens* together with the earthy material to be treated, passing sulfur gases through said mixture of comminuted wood and earthy material to produce a solvent solution containing sulfuric acid to take up the undesirable impurities without dissolving the aluminum content of the mixture, introducing a moistening medium, introducing air, and heating the same under pressure greater than atmospheric pressure, and separating the insoluble aluminum content from said solvent solution.

16. The process of treating aluminous earths and like materials to remove undesirable impurities, which process consists in providing a wet mixture of comminuted wood of the *Sequoia sempervirens* together with the earthy material to be treated, adding to said mixture sulfur oxygen compounds to produce a solvent solution containing sulfuric acid to take up the undesirable impurities without dissolving the aluminum content of the mixture, separating the insoluble aluminum content from said solution, treating the insoluble aluminum residue with sulfuric acid to form a solution of sulfates and an insoluble residue, separating said solution of sulfates from said insoluble residue, and roasting said sulfates to provide said sulfur compounds for the treatment of said mixture of wood and earthy materials.

17. The process of treating clays and like materials containing iron and alkalis present as impurities to remove the impurities, which process consists in preparing an extract by treating comminuted wood of the *Sequoia sempervirens* with a hot solution containing sulfuric acid, and subjecting the clay material to be treated to the action of the said extract, and separating the extract with the material taken up thereby from the residue of clay.

18. The process of treating clays and like materials containing iron and alkalis present as impurities to remove the impurities, which process consists in preparing an extract by treating comminuted wood of the *Sequoia sempervirens* with a hot solution containing water and sulfuric acid, and subjecting the clay material to be treated to the action of the said extract, and separating the extract with the material taken up thereby from the residue of clay.

19. The process of treating clays and like materials containing a metal and different metal compounds present as impurities to remove the different metal compounds present as impurities, which process consists in preparing an extract by treating comminuted wood of the *Sequoia sempervirens* with a hot solution containing sulfuric acid, and subjecting the clay material to be treated to the action of the said extracts, and separating the extract with the impurities taken up thereby from the residue.

20. The process of treating aluminous earths and like materials which comprises roasting to a dry condition a mixture of the material to be treated and sulfuric acid.

21. The process of treating aluminous earths and like materials which comprises roasting a mixture of the earthy material to be treated, wood of the *Sequoia sempervirens*, and sulfuric acid.

In testimony whereof I affix my signature.

FRANK LANGFORD.